US012783023B2

(12) United States Patent
Ehlen

(10) Patent No.: US 12,783,023 B2
(45) Date of Patent: Nov. 3, 2026

(54) STORAGE DRIVE CARRIER WITH A LATCH ARM HAVING A FLOATING HINGE

(71) Applicant: Lenovo Global Technology (UnitedStates) Inc., Morrisville, NC (US)

(72) Inventor: Jon Ehlen, Georgetown, TX (US)

( * ) Notice: Subject to any disclaimer, the term of this patent is extended or adjusted under 35 U.S.C. 154(b) by 76 days.

(21) Appl. No.: 18/912,785

(22) Filed: Oct. 11, 2024

(65) Prior Publication Data

US 2026/0104745 A1 Apr. 16, 2026

(51) Int. Cl.

| | |
|---|---|
| ***G06F 1/187*** | (2026.01) |
| ***G11B 33/12*** | (2006.01) |
| ***H01R 13/627*** | (2006.01) |
| ***H01R 13/629*** | (2006.01) |

(52) U.S. Cl.

CPC ............ *G06F 1/187* (2013.01); *G11B 33/124* (2013.01); *H01R 13/6275* (2013.01); *H01R 13/62938* (2013.01); *G11B 33/128* (2013.01)

(58) Field of Classification Search

None

See application file for complete search history.

(56) References Cited

U.S. PATENT DOCUMENTS

| | | | | |
|---|---|---|---|---|
| 6,683,785 B1 * | 1/2004 | Chen | G11B 33/124 | 360/137 |
| 6,695,520 B1 * | 2/2004 | Sarno | H05K 7/1409 | 439/153 |
| 7,782,606 B2 * | 8/2010 | Baker | G11B 33/124 | 361/679.33 |
| 7,808,777 B2 * | 10/2010 | Luo | G11B 33/127 | 248/316.1 |

OTHER PUBLICATIONS

"1U/3U Hard Drives with Sticky Latch", Kaleidescape Support, https://support.kaleidescape.com/aricle/1U-3U-Hard-Drives-with-Sticky-Latch, Retrieved from the Internet Aug. 21, 2024.

* cited by examiner

*Primary Examiner* — Allen L Parker
*Assistant Examiner* — Christopher L Augustin
(74) *Attorney, Agent, or Firm* — Jeffrey L. Streets

(57) ABSTRACT

A storage drive carrier apparatus includes a carrier frame configured to secure a storage drive housing and having a proximal end that engages the storage drive housing. The apparatus also includes a latch arm having a first end forming a cam latch and a second end having a spring-loaded latch bolt. A floating hinge couples the latch arm to the proximal end of the carrier frame and allows the latch arm to rotate about an axis that is perpendicular to the lateral and longitudinal directions and to move in the longitudinal direction. The apparatus also includes a main spring disposed between the first and second ends of the latch arm and directed to bias the carrier frame and storage drive in a longitudinal direction when the latch arm is in a closed position and latched condition.

20 Claims, 7 Drawing Sheets

STORAGE DRIVE CARRIER WITH A LATCH ARM HAVING A FLOATING HINGE

BACKGROUND

The present disclosure relates to a carrier for positioning a storage drive in a storage drive bay to interface the storage drive with a host computer, and more specifically, to an apparatus for securing a storage drive in, or removing the storage drive from, a storage drive bay.

BACKGROUND OF THE RELATED ART

Hard disk drives generally include a data storage disk secured within a housing that may be coupled to a carrier, sometimes referred to as a tray, which is adapted to be received and secured in a drive bay to interface with a host computer. For example, a generally circular data storage disk is rotatably coupled within the housing in a position to rotate relative to the housing and about a generally vertical axis. A disk reader head is also movably coupled within the housing to controllably track across the rotating data storage disk to retrieve data stored on the disk, or to retrievably write data to the disk. Solid state drives (SSDs), on the other hand, do not rely on mechanical components for data storage and retrieval. Instead, SSDs utilize flash memory chips to store data electronically, allowing for faster access times and greater durability compared to traditional hard disk drives. The absence of moving parts in SSDs eliminates the need for a spinning disk or read/write head, resulting in lower power consumption and reduced susceptibility to physical shock or wear.

A plurality of hard disk drives may be arranged within an array of bays within a chassis. This configuration enables a host computer to interface with numerous hard disk drives, each of which is replaceable independently of the others. Each drive bay may include a receiving port for electronically docking the hard disk drive that is secured within that bay. For example, a hard disk drive interface plug or connector may be disposed at a leading end of each hard disk drive, and the interface plug or connector may connect with a mating plug or connector positioned within the host system and at the end of the bay to electronically couple the hard disk drive to the host computer.

Data storage density may be improved using compact hard disk drive carriers that can be efficiently installed within the bays of the host system alongside other hard disk drive carriers. The host computer may be designed to continue to operate and to communicate with a plurality of hard disk drives as an individual hard disk drive carrier is removed or "hot swapped" from a drive bay or as a replacement hard disk drive carrier is installed within the vacant bay to interface with the host computer.

A hard disk drive carrier may be secured to a hard disk drive housing and inserted into a drive bay, for example, with an interface plug at the leading end of the hard disk drive being inserted into the bay first. The hard disk drive carrier may then be displaced into the bay to an interfaced position where the interface plug of the hard disk drive is docked with a mating plug of the host system. The hard disk drive carrier should secure the hard disk drive in the interfaced position using a latch apparatus to prevent the hard disk drive carrier from being inadvertently displaced from the interfaced position during use of the hard disk drive. For example, when a rotating data storage disk is present, a motor that rotates the hard disk or the actuator that positions the head to read from the hard disk or write to the hard disk may cause vibrations that can result in the hard disk drive becoming dislodged from the interfaced position or disconnected from the host system in the absence of the latch apparatus. Additionally, the drives may be housed in a drawer which is opened for drive access while the drives are operating. The action of opening the drawer may cause a physical shock (force) and/or vibration that can cause disconnection of one of the drives.

BRIEF SUMMARY

Some embodiments provide an apparatus comprising a carrier frame configured to be secured to a storage drive housing, wherein the carrier frame includes a proximal end that extends in a lateral direction for engaging a front end of the storage drive housing and first and second longitudinal side rails for engaging opposing first and second sides of the storage drive housing. The apparatus further comprises a latch arm having a first end forming a cam latch and a second end having a spring-loaded latch bolt. Furthermore, the apparatus comprises a floating hinge that couples the latch arm to the proximal end of the carrier frame, wherein the floating hinge allows the latch arm to rotate about an axis that is perpendicular to the lateral and longitudinal directions and to move in the longitudinal direction. The apparatus also comprises a main spring disposed between the first and second ends of the latch arm and directed to bias the carrier frame and storage drive in a longitudinal direction when the latch arm is in a closed position and latched condition.

DETAILED DESCRIPTION

Figure 1A:
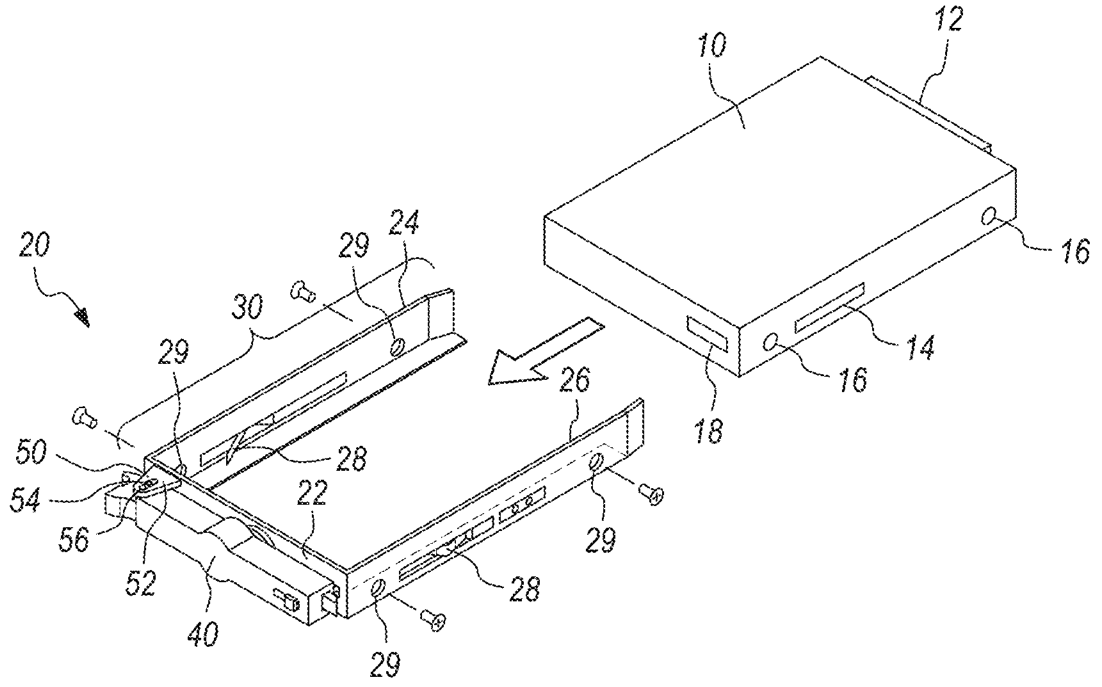
FIG. 1A is a perspective view of a storage drive being inserted into a carrier frame.

Some embodiments provide an apparatus comprising a carrier frame configured to be secured to a storage drive housing, wherein the carrier frame includes a proximal end that extends in a lateral direction for engaging a front end of the storage drive housing and first and second longitudinal side rails for engaging opposing first and second sides of the storage drive housing. The apparatus further comprises a latch arm having a first end forming a cam latch and a second end having a spring-loaded latch bolt. Furthermore, the apparatus comprises a floating hinge that couples the latch arm to the proximal end of the carrier frame, wherein the floating hinge allows the latch arm to rotate about an axis that is perpendicular to the lateral and longitudinal directions and to move in the longitudinal direction. The apparatus also comprises a main spring disposed between the first and second ends of the latch arm and directed to bias the carrier frame and storage drive in a longitudinal direction when the latch arm is in a closed position and latched condition.

The carrier frame facilitates the installation and removal of the storage drive in a storage drive bay of certain computing systems, such as a server or a dedicated storage system such as Just a Bunch of Disks (JBOD). When secured to the storage drive housing, the carrier frame may be inserted into the storage drive bay and guide the storage drive toward a drive bay connector in the back or distal end of the storage drive bay. Accordingly, a blind mate connection may be formed between the storage drive connector and the drive bay connector by simply pushing the carrier frame and storage drive subassembly into the storage drive bay and latching the carrier frame within the storage drive bay. The carrier, which may also be referred to as a carrier frame may be responsible for providing proper alignment of the connectors and maintaining a good connection between the connectors during operation of the storage drive.

The storage drive housing is a structural member that contains the electronic and/or mechanical components of the storage drive. For example, the storage drive may be a standard 3.5 inch hard disk drive (HDD) or a solid state drive (SSD). Without limitation, these storage drives may have a storage drive connector that is a Serial Attached SCSI (SAS) or similar type connector. The storage drive housing may prevent the electronic and/or mechanical components from being damaged, may facilitate handling and connection to a carrier frame, may be important for proper air cooling of the storage drive, and may provide mechanical support for the storage drive connector. In one option, the carrier frame and storage drive housing are secured together using spring clips and/or screws extending between the longitudinal side rails and the sides of the storage drive housing.

When referring to the storage drive bay, the storage drive and/or the carrier frame, the term "proximal" refers to the direction or position closest to the user and the term "distal" refers to the direction or position closest to the drive bay connector. Accordingly, the carrier frame has a proximal end that is closest to the user and the storage drive and carrier frame have a distal end that is initially inserted into the drive bay. Other terms such as "front" may be used to indicate a generally proximal component accessible to the user, whereas other terms such as "back" may be used to indicate a generally distal component that is inaccessible to the user when installed in a drive bay. When referring to the latch arm, latch bolt and/or the cam latch, the term "proximal" refers to the direction or position closest to the floating hinge. For example, the distal end of the latch arm is the furthest part of the latch arm from the floating hinge. However, the distal end of the latch bolt is the end of the latch both that is furthest from the floating hinge and the distal end of the cam latch is the end of the cam latch that is furthest from the floating hinge. Note that the latch bolt and cam latch extend in different directions relative to the floating hinge such that their respective "distal" ends are in different (generally opposite) directions.

The main spring that is directed to bias the carrier frame and storage drive in a longitudinal direction may take various forms. Without limitation, this main spring may be selected from a compression spring, wave spring, a torsion spring, beam spring and/or leaf spring. Any type of spring type may be utilized so long as it applies opposing forces to the latch arm and the proximal end of the carrier frame in order to apply a substantially perpendicular force between the storage drive connector and the drive bay connector. Furthermore, in order to apply a biasing force on the connectors, the main spring should have a sufficient length and dimensions to be partially compressed between the latch arm and the proximal end of the carrier frame even if/when the hinge pin members are at the furthest end of the floating hinge slot (i.e., furthest end from the carrier frame) and still not be completely compressed between the latch arm and the proximal end of the carrier frame even if/when the hinge pin members are at the nearest end of the floating hinge slot (i.e., nearest end to the carrier frame). Still further, the main spring will preferably be able to apply a force that is greater than a force necessary for mating the storage drive connector and the drive bay connector. For example, if a physical shock to the drive bay causes the storage drive connector to begin moving away from the drive bay connector, the spring force should be great enough to force the storage drive connector back into full engagement with the drive bay connector. Without limitation, the spring force may be referred to as a constant force in the sense that the spring force is continually being applied against the front of the carrier frame once the latch arm has been secured into the opposing fixed slots or other fixed features in the storage drive bay.

In some embodiments, the main spring is laterally centered on the proximal end of the carrier frame or centered on the storage drive connector. This position helps for applying the spring force in a generally longitudinal direction that is evenly applied across the storage drive connector where the storage drive connector is also laterally centered on the storage drive. The main spring is preferably secured to the latch arm and engages the proximal end of the carrier frame as the latch arm approaches the closed position. However, the main spring could alternatively be secured to the proximal end of the carrier frame and engage the latch arm as the latch arm approaches the closed position.

In some embodiments, the carrier frame is configured to orient the storage drive housing to position a storage drive connector on a distal end of the storage drive housing for forming a blind mate connection with a mating drive bay connector within a storage drive bay. A blind mate connector is a type of electrical connector that has a mating action that happens when sliding or snapping the connectors together without requiring wrenches or other tools but including a self-aligning feature which allows a small misalignment when mating. In various embodiments, the self-aligning feature may be in the connectors themselves, provided by the carrier frame, or some combination thereof. Beneficially, the sliding of the carrier frame within the drive bay side walls provide lateral and vertical alignment of the connectors.

When the latch arm is in a closed and latched condition, a distal end of the cam latch is received into a first slot in a first lateral side wall of the storage drive bay and a distal end of the latch bolt is received into a second slot in a second lateral side wall of the storage drive bay. Accordingly, the proximal ends of the first and second slots establish fixed hard stops (also referred to herein as "Datum A" and "Datum B") for the latch arm. With the latch arm in this closed and latched condition, the main spring is configured to apply a longitudinal force directed into the back of the storage drive bay and maintain the connection between the storage drive connector and the drive bay connector. While the latch arm has a fixed hard stop, the main spring allows the carrier frame and storage drive subassembly to "float" between the latch arm and the drive bay connector. If outside forces, such accidentally physically bumping a chassis that includes the storage drive bay, cause the carrier frame and storage drive subassembly to move slightly in a proximal direction, then the main spring will immediately respond by pushing the carrier frame and storage drive subassembly in the distal direction to maintain the connection between the storage drive connector and the drive bay connector. Accordingly, embodiments prevent unseating of the storage drive connector under vibration and/or physical shocks.

The latch arm is preferably selectively securable in the closed and latched condition with the cam latch received in a first slot (i.e., engaging the Datum A) in a first lateral side wall of a storage drive bay and the latch bolt received in a second slot (i.e., engaging the Datum B) in a second lateral side of the storage drive bay. The first lateral side wall of the storage drive bay opposes the second lateral side wall of the storage drive bay, such as left and right side walls. Furthermore, the latch arm may be selectively unsecured by a user. Specifically, the latch arm is rotatable from the closed and latched condition to an open and unlatched condition by retracting the latch bolt from the second slot and rotating the cam latch toward the carrier frame.

A spring-loaded latch is a type of mechanical latch that uses a spring to engage and disengage the locking mechanism. The latch bolt extends from and retracts into a housing formed in the distal end of the latch arm. The distal end of the latch bolt is extendable into the slot in the second side wall of the storage drive bay and has a retention face that engages a catch surface of the slot. The latch bolt is preferably tapered on one side so that the latch bolt will slide against the side of the storage drive bay and automatically retract during closing of the latch arm, then automatically extend into the slot when the latch bolt has passed the catch surface. Conversely, the retention face of the latch bolt may be a flat surface that lies in a lateral plane when the latch bolt is deployed into the slot and engaged against the proximal edge of the slot.

The spring-loaded latch preferably includes a coil spring secured inside the latch arm to push the latch body and cause the latch bolt to extend linearly outward from the distal end of the latch arm. Furthermore, the coil spring keeps the latch bolt positioned within the slot until a manual force is applied to a retraction mechanism or trigger, such as a finger button, that is secured to the latch bolt and user-accessible for manually retracting the latch bolt with a force compressing the coil spring. With the latch bolt retracted from the slot, the latch arm is free to swing open. Subsequent release of the trigger with the latch arm in an open position allows the latch bolt to return to its extended position (and not latched).

In some embodiments, the latch bolt of the spring-loaded latch may include a latch hook that extends from the latch bolt toward the carrier frame. The latch hook is configured to be received in a slot in the proximal end of the carrier frame when the latch arm is in a closed position. While the latch hook should be sufficiently long to extend into the proximal end of the carrier frame and also to avoid any interference with the "floating" range of the carrier frame and storage drive subassembly relative to the latch arm, the latch hook should be able to latch the latch arm in a closed position when the carrier frame is not installed in a storage drive bay. Accordingly, the latch arm may be selectively securable in a closed and unlatched condition (relative to the storage drive bay) with the latch hook received in the slot in the proximal end of the carrier frame. In one option, with the latch arm secured in a closed and unlatched condition as just described, the cam latch may extend laterally beyond the edge of the carrier frame and prevent the carrier frame and storage drive subassembly from being fully inserted into the storage drive bay.

In some embodiments, the floating hinge includes first and second floating hinge plates that are secured to a proximal end of the carrier frame and each floating hinge plate includes a longitudinal pin slot slidably securing a hinge pin. The hinge plates are preferably spaced apart and parallel. Furthermore, the longitudinal pin slot will preferably have a sufficient length to allow the carrier frame and storage drive subassembly to travel a distance greater than or equal to the connector wipe distance, such as a SAS connector wipe distance.

The floating hinge may include either a single hinge pin that is received in both longitudinal pin slots extend or a pair of hinge pin members that include first and second hinge pin members that are axially aligned on opposing sides of the latch arm and are received in the longitudinal pin slots of the first and second floating hinge plates, respectively. Furthermore, the hinge pin may be formed as part of the latch arm or may be an independent component extending through the latch arm. Hinge pin members are preferably formed as part of the latch arm, but also could be independent components secured to the latch arm. Whether floating hinge comprises a single hinge pin or a pair of hinge pin members, the latch arm should be free to pivot about an axis defined by the hinge pin or hinge pin members, and the hinge pin or hinge pin members should be free to move along the longitudinal axis of both longitudinal pin slots.

In some embodiments, a hinge pin extends between the first and second floating hinge plates and the main spring may be a torsion spring including one or more coils secured about a central portion of the hinge pin, a first leg biased against the latch arm and a second leg biased against the proximal end of the carrier frame. Accordingly, the torsion spring may bias the latch arm toward an open position when the spring-loaded latch is not secured in the second slot of the drive bay (i.e., not latched). However, in this embodiment, the torsion spring is also responsible for the forces that are required to maintain the connection between the storage drive connector and the drive bay connector. While this torsion spring serves two purposes, it is the responsibility for maintaining the connection that requires the torsion spring to be much stronger. Such a torsion spring may also have legs that extend into a central area between of the latch arm and the proximal end of the carrier frame so that the spring forces pushing the proximal end of the carrier frame in the distal direction are substantially longitudinal and centered on the storage drive connector.

In some embodiments, a hinge pin extends between the first and second floating hinge plates and the apparatus further comprises a torsion spring (in addition to the main spring). The torsion spring may include one or more coils secured about a central portion of the hinge pin, a first leg biased against the latch arm and a second leg biased against the proximal end of the carrier frame, wherein the torsion spring biases the latch arm toward an open position when the spring-loaded latch is not secured. In this embodiment, the torsion spring may be responsible for moving the latch arm to an open position, but not responsible for the forces required to maintain the connection between the storage drive connector and the drive bay connector. Specifically, in this embodiment, the torsion spring is included in addition to the main spring that maintains the connection between the storage drive connector and the drive bay connectors. Therefore, the torsion spring may be much smaller and lighter since the latch arm is expected to be light in weight and operate with little resistance to opening.

Rotating the latch arm from an open position to a closed position causes the cam latch to move beyond a first lateral edge of the carrier frame and in a proximal longitudinal direction. With the carrier frame positioned in the storage drive bay, the cam latch aligns with the first slot in the first side wall of the storage drive bay. Accordingly, the movement of the cam latch beyond the first lateral edge of the carrier frame causes the cam latch to enter into the open slot and the subsequently movement in a proximal longitudinal direction causes the cam latch to contact the proximal end of the slot (i.e., Datum B) and then push the carrier frame and storage drive subassembly further into the storage drive bay.

In some embodiments, a distal end of the latch bolt has a tapered surface directed to engage the second lateral side wall of the storage drive bay in a closing direction. Specifically, with the carrier frame positioned in the storage drive bay, rotating the latch arm from the open position to the closed position causes the tapered surface of the latch bolt to contact the second lateral side wall of the storage drive bay, retract toward the latch arm and slide along the second lateral side wall of the storage drive bay, and then extend into the slot in the second lateral side wall of the storage drive bay to become latched. The latch bolt then engages the proximal end of the fixed slot (i.e., Datum A). Although a user may latch the latch arm in the storage drive bay by manually retracting the latch bolt and then releasing the latch bolt into the slot, the tapered surface may prevent the need to manually retract the latch bolt in favor of simply pushing the latch arm in a closing direction until the latch bolt becomes latched.

In some embodiments, the latch arm may further include a second cam element extending from the first end of the latch arm. The second cam element may be used for mechanically ejecting the carrier frame and storage drive subassembly from the storage drive bay in response to moving the latch arm from a closed and latched condition to the open position. For example, the second cam element may be configured to engage the first sidewall of the storage drive bay in front of (i.e., in a proximal direction from) the first slot. Rotating the latch arm in an opening direction causes the second cam element to engage the front of the first side wall as the same rotation causes the cam latch to withdraw from the first slot in the first side wall. Accordingly, the latch arm may be used as a lever to gain mechanical advantage for disconnecting the storage drive connector from the drive bay connector. Embodiments may further include methods for removing a storage drive from a storage bay as described herein.

The exact lateral position of the floating hinge on the proximal end of the carrier frame and on the latch arm may vary, but the floating hinge should be adjacent the first lateral edge of the carrier frame. In some embodiments, a distance from the floating hinge to the first lateral edge of the carrier frame (i.e., the edge from which the cam latch is extendable) is less than ¼ of a distance from the floating hinge to a second lateral edge of the carrier frame (i.e., the edge from which the latch bolt is extendable), and wherein a distance from the floating hinge to a distal end of the cam latch is less than ¼ of a distance from the floating hinge to a distal end of the latch bolt. The distance from the floating hinge to the first lateral edge of the carrier frame may be considered to be a load arm of the latch arm (a lever) and the distance from the floating hinge to the second lateral edge of the carrier frame may be considered to be an effort arm of the latch arm.

In some embodiments, the apparatus may further comprise a storage drive bay having a first side wall with a first latch slot, a second side wall with a second latch slot, and a drive bay connector that is secured in a distal end of the storage drive bay and oriented in a proximal direction. The first and second latch slots have a fixed position relative to the drive bay connector and the proximal ends of the first and second latch slots establish fixed Datum A and Datum B that are used to register the carrier frame and storage drive assembly into the storage drive bay. Embodiments of the carrier frame and storage drive assembly may be secured in the storage drive bay using the latch arm as described in any of the embodiments described herein.

Embodiments provide the technical benefit of constantly or continuously applying a force against the SAS connector to prevent a disconnect from occurring in the storage drive connection during a physical shock or vibration event. Embodiments may apply a compression or bias force on the storage drive so that the connector of the storage drive is pressed against or toward the connector in the storage drive bay. Most preferably, the compression force is available over a sufficient distance to make up for any accumulation of dimensional tolerances between components in the storage drive system. For example, in systems having a dense JBOD (Just a Bunch Of Discs) or Storage Servers with pull out access like a drawer, dimensional tolerances between the latching surface of the hard disk drive (HDD) partitions and the SAS connector may stack up. While reducing the manufacturing tolerances of all the components involved may improve the situation, the improved tolerances result in higher part costs. Embodiments of the carrier frame described herein engage the first and second latch slots with their fixed position relative to the storage drive connector and provide overtravel and constant pressure without damaging the latch or other parts. Embodiments may further include methods for installing a storage drive into a storage bay as described herein.

FIG. 1A is a perspective view of a storage drive 10 being inserted into a storage drive carrier 20. The storage drive 10 has a storage drive connector 12 on a distal end of the drive for connecting to the drive bay connector. As shown, the storage drive 10 also includes one or more features for securing to the carrier 20, such as a recess 14 and/or a pair of screw holes 16. Another recess 18 may be needed to facilitate a latch hook as described elsewhere.

The carrier 20 includes a carrier frame 30 and a latch arm 40 that is coupled to the carrier frame 30 by a floating hinge 50. The floating hinge 50 includes a pair of hinge plates 52 (only one shown in FIG. 1A) secured to the carrier frame 30 and a hinge pin 54 that is secured in a slot 56 of the hinge plates 52. The carrier frame 30 includes a proximal end frame member 22, a first lateral side rail 24, and a second lateral side rail 26. The first and second lateral side rails 24, 26 each include a spring clip 28 that clips into opposing recesses 14 in the sides of the storage drive 10 and a set of holes 29 (four total are shown) for receiving screws therethrough and into the screw holes 16 in the storage drive 10.

Figure 1B:
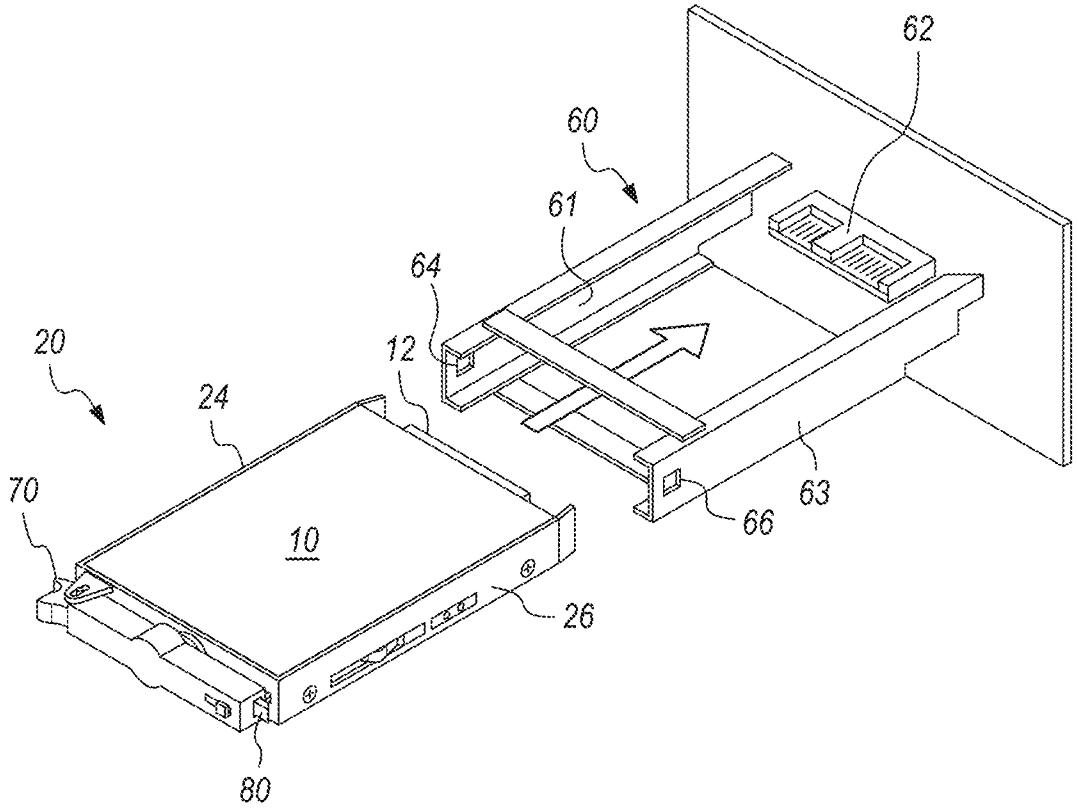
FIG. 1B is a perspective view of the carrier frame and storage drive assembly being installed into a storage drive bay for blind mating with a connector at the distal end of the storage drive bay.

FIG. 1B is a perspective view of the carrier 20 and storage drive 10 already secured together to form a carrier frame and storage drive assembly. The assembly is laterally (side-to-side) and vertically (up and down) aligned for being installed longitudinally (along the direction of the bold arrow) into a storage drive bay 60 for blind mating with a drive bay connector 62 at the distal end of the storage drive bay. To install the storage drive 10, the assembly is inserted into the open proximal end of the storage drive bay 60 so that the first lateral side rail 24 is guided in the distal direction along the first side wall 61 of the storage drive bay 60 and the second lateral side rail 26 is guided in the distal direction along the second side wall 63 of the storage drive bay 60. In this manner, the storage drive connector 12 is aligned for connection with the drive bay connector 62. Note the position of a first lateral slot 64 in the first side wall 61 for receiving a cam latch 70 and a second lateral slot 66 in the second side wall 63 for receiving a latch bolt 80

Figure 1C:
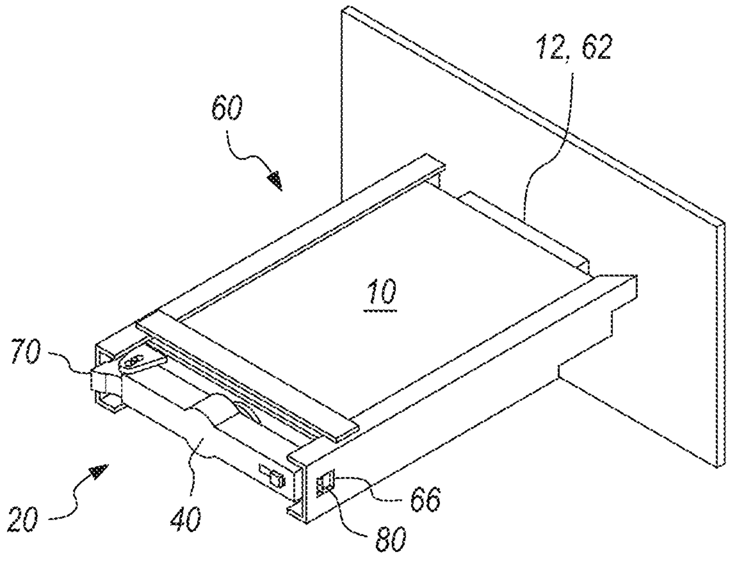
FIG. 1C is a perspective view of the carrier frame and storage drive latched into the storage drive bay.

FIG. 1C is a perspective view of the carrier 20 and the storage drive 10 latched into the storage drive bay 60. This is an operative position for the storage drive 10 since the connection between the storage drive connector 12 and the drive bay connector 62 has been formed, which provides for power delivery to the storage drive 10 and communication of a computing system, such as a server, with the storage drive 10. As shown, the latch arm 40 is closed and latched into the storage drive bay 60. Specifically, the cam latch 70 is secured in the first lateral slot 64 (not shown; see FIG. 1B) and the latch bolt 80 is secured in the second lateral slot 66. The construction and operation of the latch arm 40, carrier 20 and slots 64, 66 of the storage drive bay 60 are described in more detail below in referenced to FIGS. 2A-E and 3A-F.

Figure 2A:
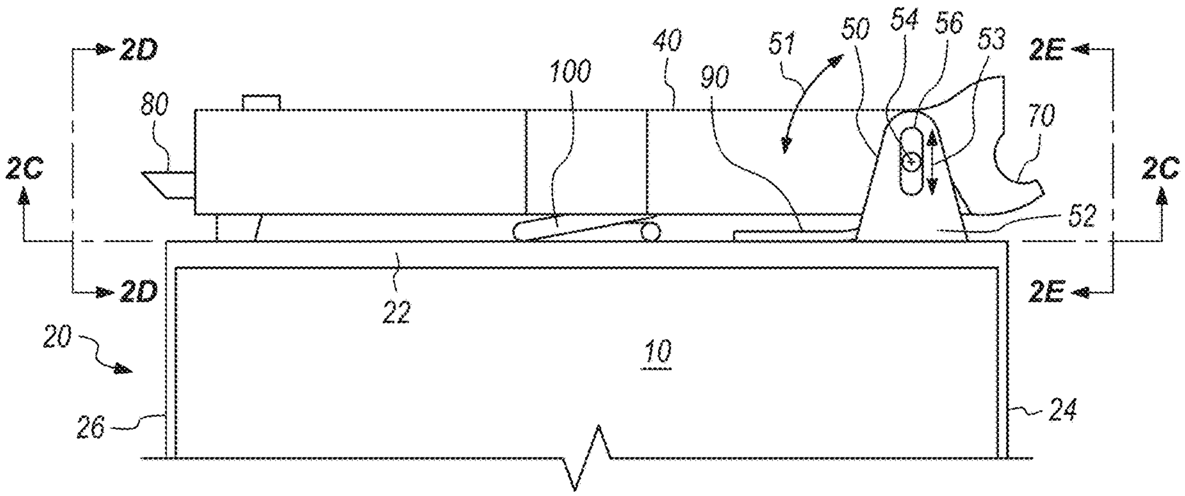
FIGS. 2A-E include top, front, bottom, first end and second end views of a proximal end of the carrier frame including a latch arm for securing the carrier frame into a storage drive bay.

FIGS. 2A-E include top, front, bottom, first end and second end views of a proximal end 22 of the carrier frame 20 including a latch arm 40 for securing the carrier frame 20 into a storage drive bay. FIG. 2A is a top view of the latch arm 40 extend across the proximal end 22 carrier frame 20. The floating hinge 50 includes a pair of hinge plates 52 (only one shown; see FIG. 2C) secured to the carrier frame 20. Each hinge plate 52 includes a longitudinal slot 56 for receiving and securing a hinge pin 54 that is secured to the latch arm 40. The floating hinge 50 allows the latch arm 40 to rotate (see curved arrow 51) about the axial center of the hinge pin 54 and/or translate longitudinally (see straight arrow 53) along the longitudinal axis of the slots 56.

The latch arm 40 includes a cam latch 70, torsion spring 90 (only one leg shown), main spring 100 (only partially shown) and a latch bolt 80 (only partially shown). These elements of the latch arm 40 are described in greater detail with respect to the other Figures.

Figure 2B:
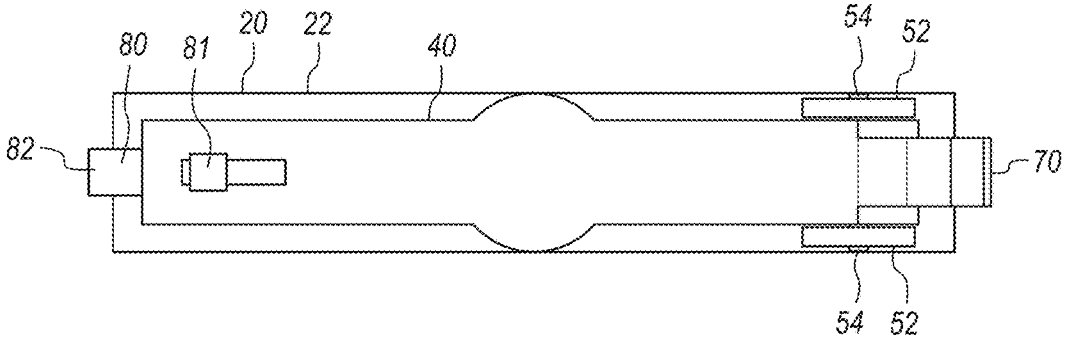

FIG. 2B is a front view of the latch arm 40 and the proximal end 22 of the carrier frame 20. In this view, the pair of floating hinge plates 52 are shown on opposing sides of the latch arm 40 with a hinge pin 54 extending through the latch arm 40 (or from each side of the latch arm) and being secured in the slot 56 (See FIG. 2A). Accordingly, the latch arm 40 may rotate about the axis of the hinge pin 54. FIG. 2B also clearly shows a retraction member 81 that is accessible to a user even when the carrier frame 20 is secured in a storage drive bay. Moving the retraction member 81 to the right in FIG. 2B will compress a coil spring (not shown) within the latch bolt 80 and retract a latch element 82 inwardly in the same direction.

Figure 2C:
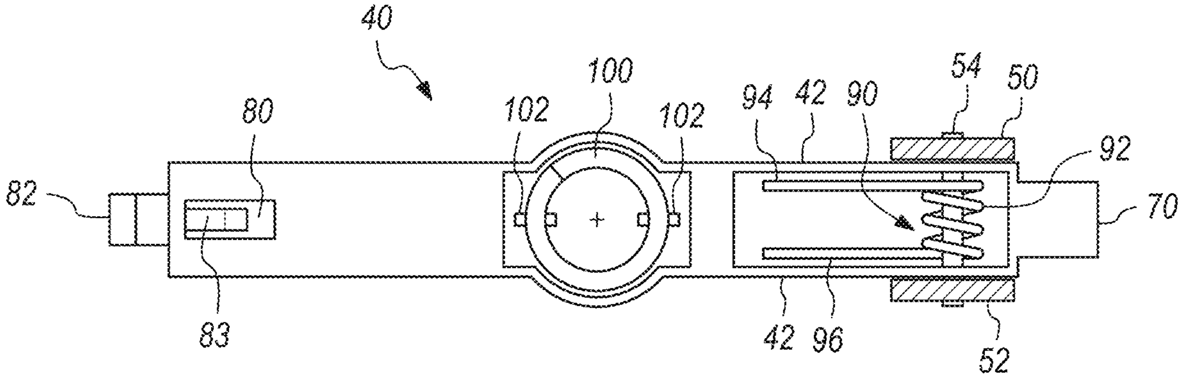

FIG. 2C is a bottom view of the latch arm 40 as seen along line 2C-2C in FIG. 2A. The hinge pin 54 passes through the two sides 42, 44 of the latch arm 40 and extends between the two hinge plates 52. The torsion spring 90 has a plurality of coils 92 encircling the central portion of the hinge pin 54 and first and second legs 94, 96. The torsion spring 90 is loaded so that the first leg 94 presses against the proximal end 22 of the carrier frame 20 and the second leg 96 presses against the latch arm 40. In this manner, the torsion spring 90 biases the latch arm 40 to open whenever it is unlatched.

FIG. 2C also shows a main spring 100 secured in the latch arm 40, such as with a pair of tabs holding a first coil. The main spring 100 should be selected to have a spring force that is greater than the force necessary to connect the storage drive connector and the drive bay connector over a distance at least equal to the range of motion of the hinge pin in the floating hinge slot. Furthermore, the spring force of the main spring 100 should be directed in a longitudinal direction (i.e., toward the distal end of the storage drive bay when the carrier frame is inserted into the bay).

FIG. 2C further shows the latch bolt 80 at the distal end of the latch arm 40. Much of the latch bolt 80 is within the latch arm 40, but a distal end of the latch bolt 80 forms the latch element 82. The latch bolt 80 may further include a latch hook 83 that extends from the latch bolt 80 as will be shown in greater detail in later Figures.

Figure 2D:
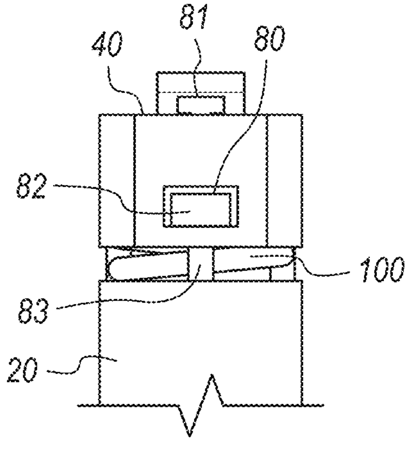

FIG. 2D is a first end view of the latch arm 40 and the carrier frame 20. This view is seen from the end of the latch arm 40 having the spring-loaded latch. Each of the components in FIG. 2D have already been introduced in reference to other Figures but are shown in FIG. 2D for further context.

Figure 2E:
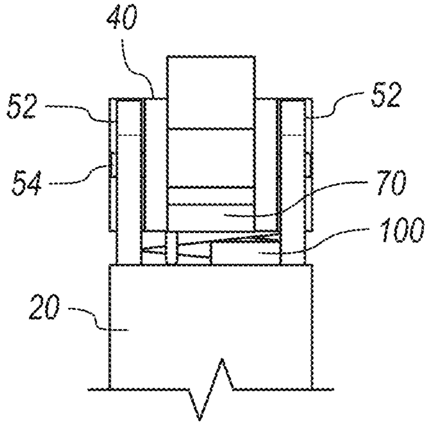

FIG. 2E is a second end view of the latch arm 40 and carrier frame 20 as seen from the end of the latch arm 40 having the cam latch 70. Again, each of the components in FIG. 2E have already been introduced in reference to other Figures but are shown in FIG. 2E for further context.

FIGS. 3A-F illustrate the latch arm as it is used in one embodiment of a sequence of operations to install the carrier 20 and storage drive 10 in a storage drive bay 60. The configuration and use of each component of the latch arm may be further understood through the discussion of these Figures. Each of these Figures is a top view using dashed lines to illustrate parts of components that are inside the latch arm 40 and may not be directly seen from the top.

Figure 3A:
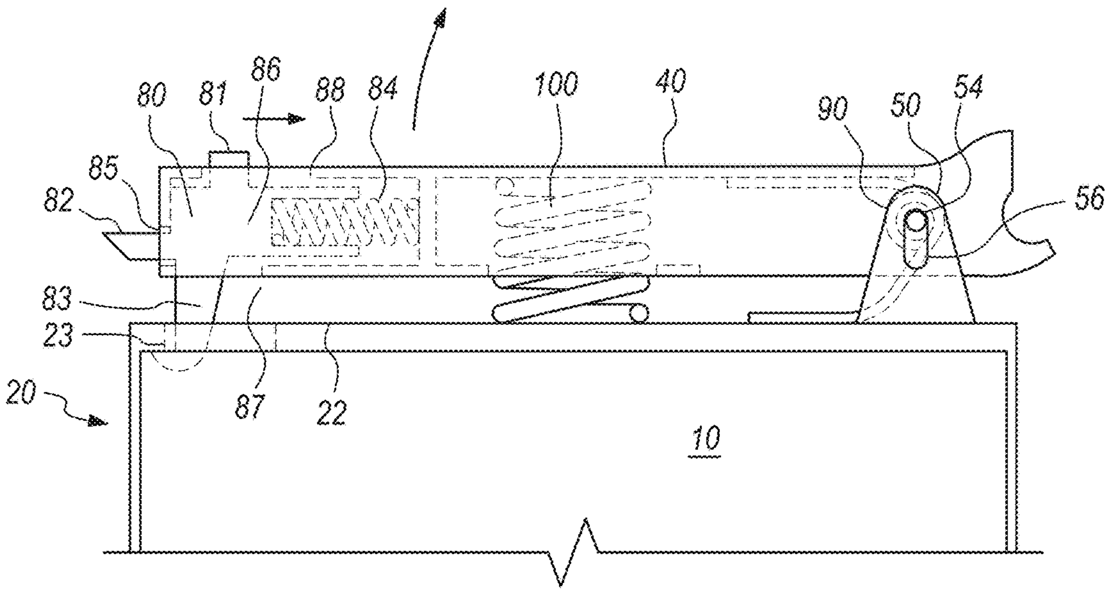
FIG. 3A is a top view of the latch arm in a storage condition prior to use.

FIG. 3A is a top view of the apparatus in a storage condition prior to use. The latch arm 40 is secured to the proximal end 22 of the carrier frame 20 at two points. First, the floating hinge 50 secures a first end of the latch arm 40, although allowing the latch arm to pivot about a central axis of the hinge pin 54 and translate longitudinally as limited by the length of the longitudinal slot 56. Second, the latch hook 83 that extends from the latch bolt 80 is securing a second end of the latch arm 40 by engaging the slot 23 in the proximal end 22 of the carrier frame 20. As a result of being secured at these two points, the latch arm 40 does not just swing open during storage or preparation for use.

In FIG. 3A, the main spring 100 has one end pressing against the latch arm 40 and another end pressing against the proximal end 22 of the carrier frame 20. Accordingly, the latch arm 40 is pushed up (as see in FIG. 3A) to the limits of the hinge pin 54 in longitudinal slot 56 and the limits of the latch hook 83. The torsion spring 90 is also engaging both the latch arm 40 and the proximal end 22 of the carrier frame 20.

The latch bolt 80 is secured to the distal end of the latch arm 40 with the latch element 82 extending laterally to the side through an opening 85, the retraction member 81 extending longitudinally (in a proximal direction) through a slot 88, the latch hook 83 extending mostly longitudinally (in a distal direction) through the opening/slot 87, and the coil spring 84 biasing the latch body 86 toward a distal limitation. Therefore, the latch hook 83 is biased against the lateral edge of the slot 23 so that the latch hook 83 will not disengage the slot unless a person uses the retraction member 81 to compress the coil spring 84 and move the latch body 86 to the right. Note that the When the retraction member 81 has been used to disengage the latch hook 83 from the slot 23, then the entire latch arm 40 may swing open by rotation about the hinge pin 54.

Figure 3B:
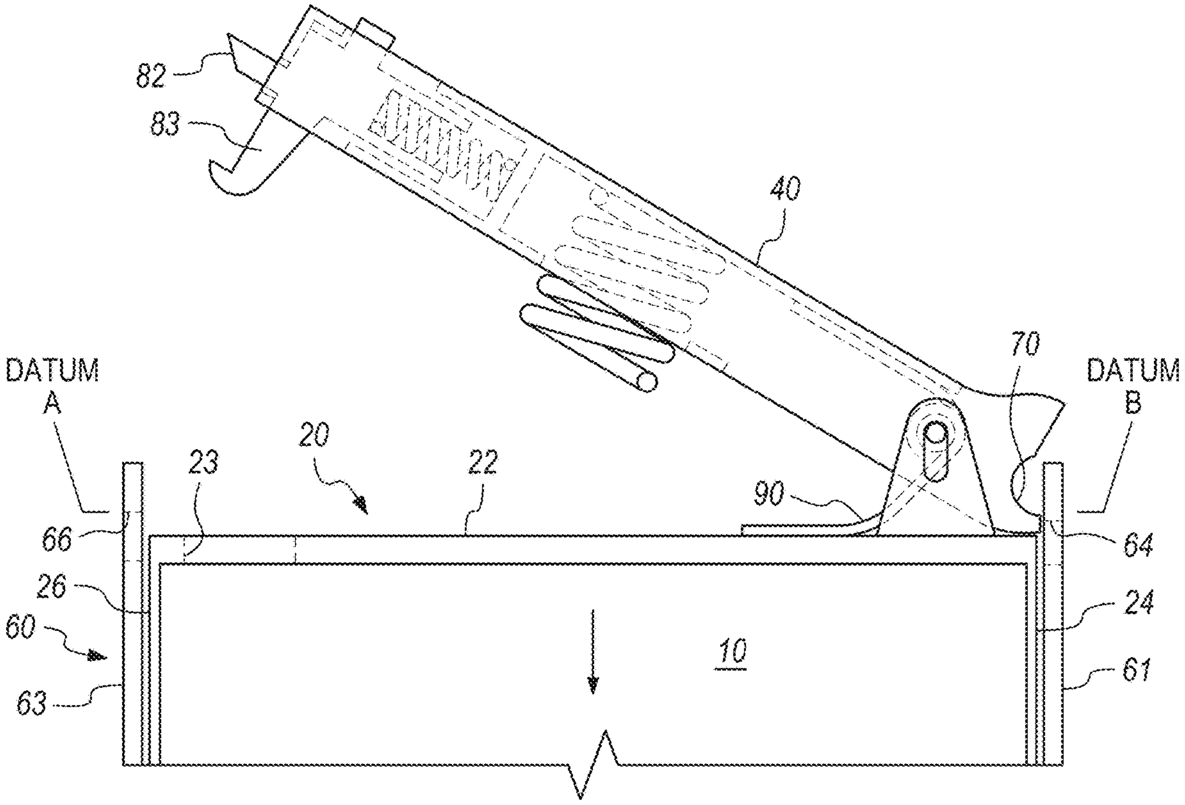
FIG. 3B is a top view of the latch arm in an open condition with the carrier frame being introduced into the storage drive bay.

FIG. 3B is a top view of the apparatus in an open condition with the carrier frame 20 being introduced into the storage drive bay 60. The latch hook 83 has been disengaged and the main spring 100 is no longer in contact with the carrier frame 20 and now in an elongated and relaxed condition. However, the torsion spring 90 has pushed the latch arm 40 to the open position.

As the carrier frame 20 and storage drive 10 are being positioned into the storage drive bay 60, the first lateral side rail 24 is guided along the inside of the first side wall 61 of the storage drive bay 60 and the second lateral side rail 26 is guided along the inside of the second side wall 63 of the storage drive bay 60. This will cause the connectors 12, 62 (not shown; see FIG. 1B) to be aligned for blind mate connection. The first side wall 61 includes a first slot 64 for receiving the cam latch 70 and the second side wall 63 includes a second slot 66 for receiving the latch element 82. However, with the carrier frame 20 positioned into the bay 60, it is the cam latch 70 that initially laterally aligns with the first slot 64. In this position, rotation of the latch arm 40 in a direction toward the closed position will cause the cam latch 70 to extend into the first slot 64. Note that the proximal ends of the first and second slots 64, 66 are in a fixed position relative to the storage bay connector 62 (see FIG. 1B) and are labeled as "Datum B" and "Datum A". Datum A and Datum B preferably have the same fixed distance from the back of the storage drive bay 60 and the drive bay connector 62.

Figure 3C:
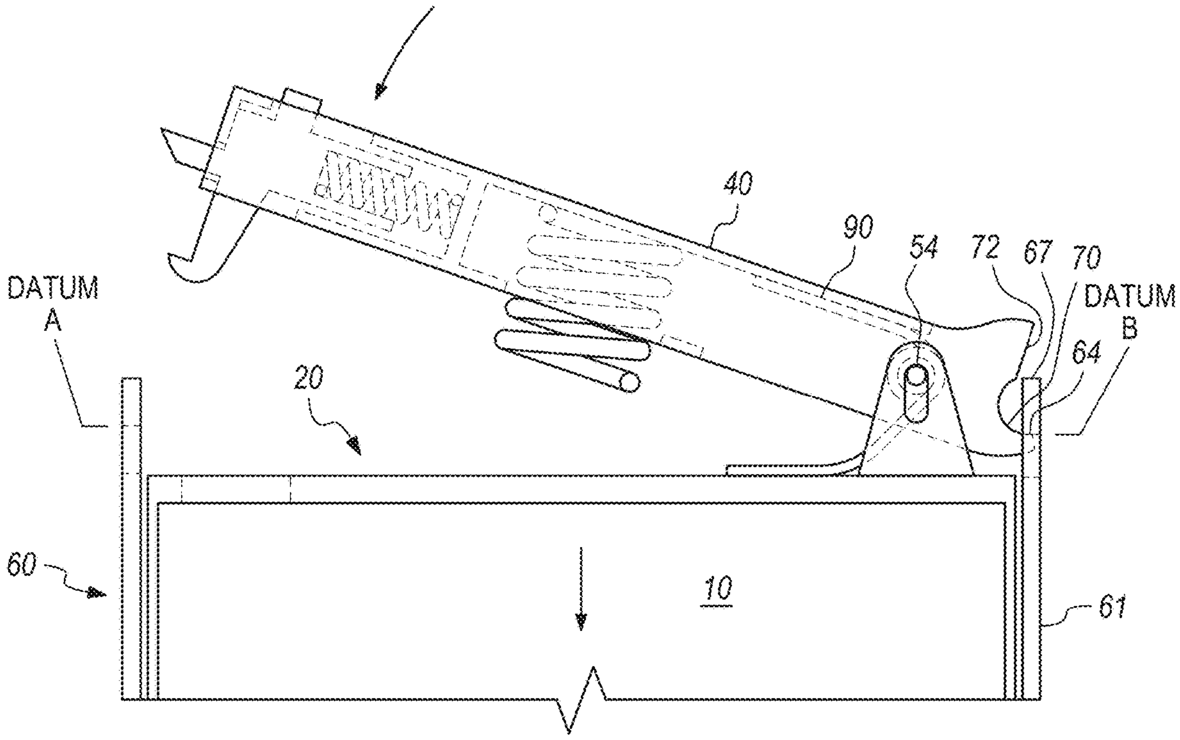
FIG. 3C is a top view of the latch arm in a position where the latch lever (cam latch) being received into a first slot in the storage drive bay.

FIG. 3C is a top view of the apparatus in a position where the cam latch 70 extends beyond the lateral edge of the carrier frame 20 and is about to be received into the first slot 64 in the storage drive bay 60. The user is applying a closing force to the latch arm 40 to overcome the biasing force of the torsion spring 90. Since the cam latch 70 is on an opposite side of the hinge pin 54 from the distal end of the latch arm 40 where the closing force is being applied, the counter-clockwise rotation of the latch arm 40 cause the cam latch 70 to move through an arc laterally outward and in a proximal direction to engage the proximal end of the first slot 64 (i.e., engage Datum B).

Figure 3D:
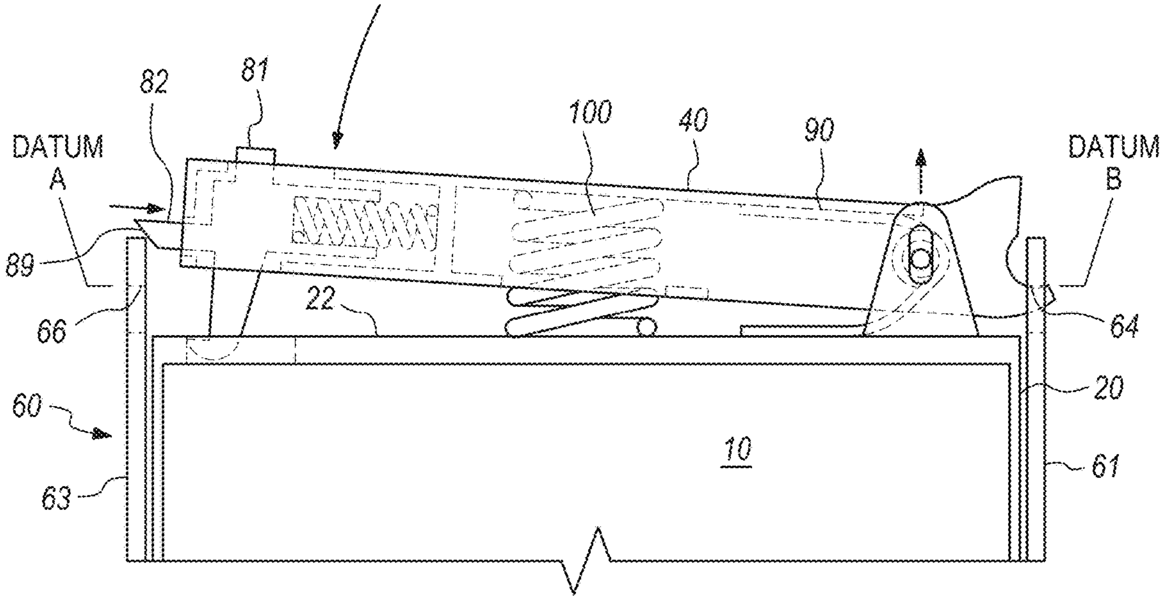
FIG. 3D is a top view of the latch arm in a position where the latch bolt engages a second side of the storage drive bay.
Figure 3E:
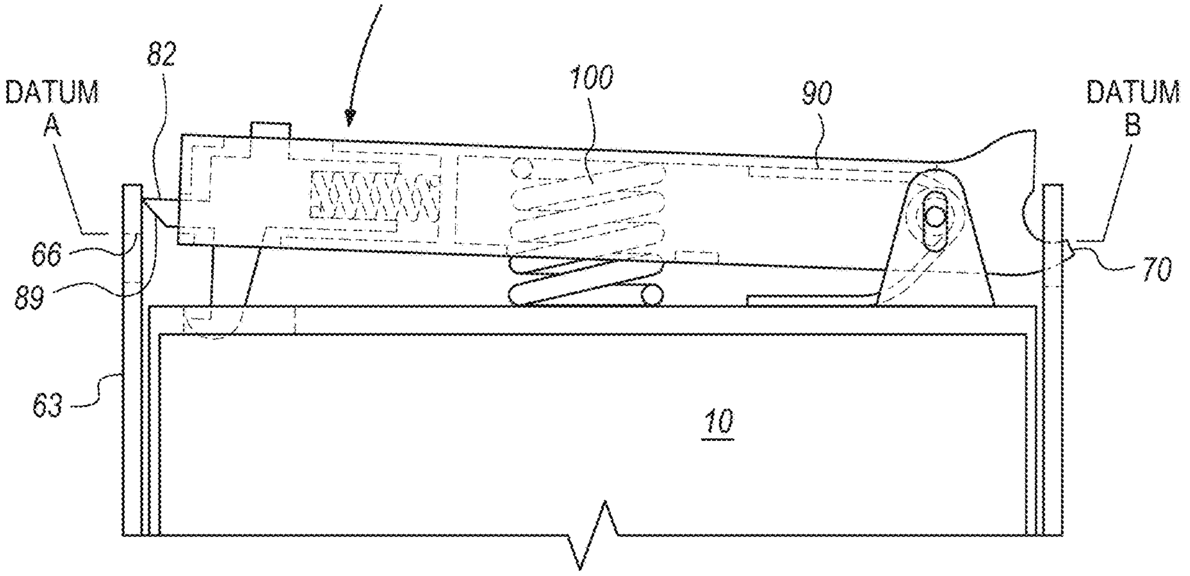
FIG. 3E is a top view of the latch arm in a position where the latch bolt is partially retracted as it slides along the second side of the storage drive bay toward the second slot.
Figure 3F:
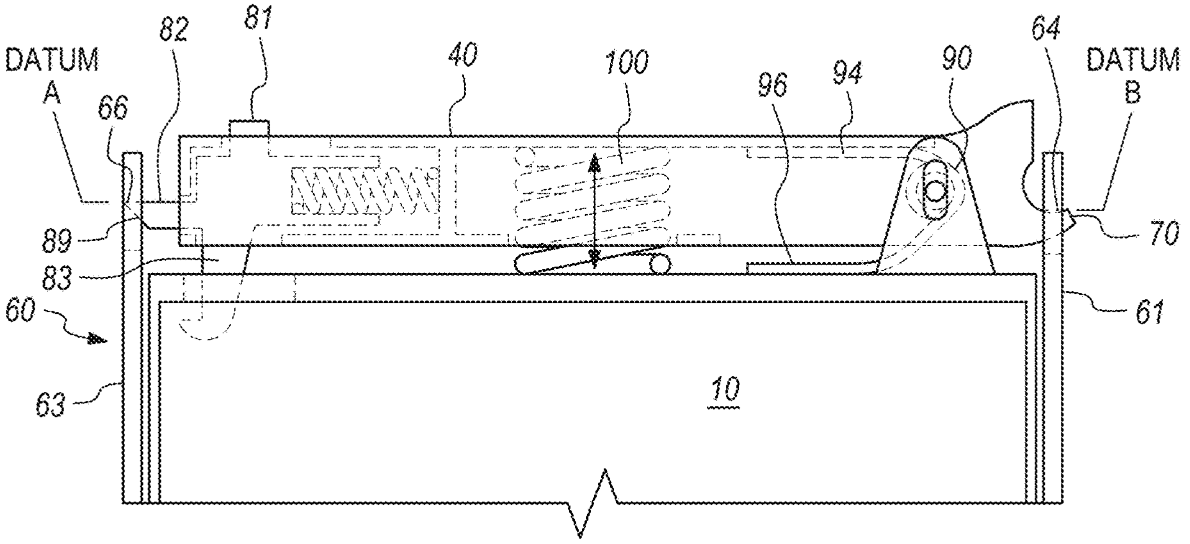
FIG. 3F is a top view of the latch arm in a position with the latch bolt secured in the second slot and the main spring biasing the carrier frame inward into the storage drive bay.

FIGS. 3D-F are top views of the apparatus in which the latch element 82 is being latched into the storage drive bay 60. In FIG. 3D, a distal end of the latch element 82 has a tapered surface 89 directed to engage the second lateral side wall 63 of the storage drive bay in a closing direction. With the carrier frame 20 already positioned in the storage drive bay 60, rotating the latch arm 40 from the open position (FIG. 3B) to the closed position (FIG. 3F) causes the tapered surface 89 of the latch bolt 80 to contact the second lateral side wall 63 of the storage drive bay (FIG. 3D), retract into the latch arm 40 and slide along the inside of the second lateral side wall 63 of the storage drive bay (FIG. 3E), and then extend into the slot 66 in the second lateral side wall 63 of the storage drive bay to become latched (FIG. 3F). In the closed and latched position shown in FIG. 3F, the latch element 82 not only extend into the slot 66, but engages the proximal end of the slot 66 (i.e., engages the Datum A). Although a user may latch the latch arm in the storage drive bay by manually retracting the latch bolt using the retraction element 81 and then releasing the latch element 82 into the slot 66, the tapered surface 89 may prevent the need to manually retract the latch bolt in favor of simply pushing the latch arm 40 in a closing direction until the latch element 82 becomes latched.

In the process of closing the latch arm 40 from the open position shown in FIG. 3B to the closed and latched condition shown in FIG. 3F, the main spring 100 is brought into contact with the proximal end 22 of the carrier frame 20 (FIG. 3D) and then becomes compressed (FIGS. 3E-F). Once the latch arm 40 is latched into place with the cam latch 70 secured in the first slot 64 of the first side wall 61 of the storage drive bay 60 (i.e., engaging Datum B) and the latch element 82 secured in the second slot 66 of the second side wall 63 of the storage drive bay 60 (i.e., engaging Datum A), the main spring 100 biases the carrier frame 20 and the storage drive 10 into the storage drive bay 60 in a longitudinal direction. Accordingly, the main spring 100 opposed any random or accidental forces that might disconnect or disturb the connection between the storage drive connector 12 and the mating drive bay connector 62 (see FIGS. 1B-C). Optionally, the main spring 100 could be eliminated and the torsion spring 90 could be a stronger spring with longer legs 94, 96 in order to apply the same force and perform the same function as described herein for the main spring 100. However, with the latch arm 40 registered in a fixed position between the slots 64, 66 (engaging Datum A and B), the floating hinge 50 and the main spring 100 enable a connection force to be applied between the storage drive connector and the drive bay connector despite any stack up or accumulation of dimensional tolerances between the drive bay connector and Datums A and B. In other words, if the distance between the drive bay connector and the Datums A and B in one installation was 3 millimeters greater than what was designed, perhaps due to various components being manufactured to the high end of their tolerances, then a floating hinge allowing for at least 3 millimeters of range can still apply a connection force to keep the storage drive connector connected to the drive bay connector.

Unlatching the latch arm 40 and opening the latch arm 40 to enable removal of the carrier frame 22 and storage drive 10 may be performed by reversing the operations of FIGS. 3B-3F. Specifically, in FIG. 3F, the retraction element 81 should be manually moved to the right so that the latch element 82 is removed from the slot 66. Next, the main spring 100 and/or the torsion spring 90 will push the latch arm 40 open as shown in the sequence of FIGS. 3E, 3D and then 3C. Once the cam latch 70 has withdrawn from the slot 64 in the first side wall 61, then the user may pull the carrier 20 and storage drive 10 out of the storage drive bay 60.

In the process of opening the latch arm 40 and disconnecting the connectors 12, 62, a second cam element 72 formed at the first end of the latch arm 40 may be used for mechanical advantage. As shown in FIG. 3C, the second cam element 72 may be configured to engage the first sidewall 61 of the storage drive bay 60 at a leading edge in front of (i.e., in a proximal direction from) the first slot 64. Rotating the latch arm in an opening direction causes the second cam element 72 to engage the front edge 67 of the first side wall 61 as the same rotation causes the cam latch 70 to withdraw from the first slot 64 in the first side wall. Accordingly, the latch arm 40 may be used as a lever to gain mechanical advantage for disconnecting the storage drive connector 12 from the drive bay connector 62 (see FIGS. 1B-C).

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:

a carrier frame configured to be secured to a storage drive housing, wherein the carrier frame includes a proximal end that extends in a lateral direction for engaging a front end of the storage drive housing and first and second longitudinal side rails for engaging opposing first and second sides of the storage drive housing;

a latch arm having a first end forming a cam latch and a second end having a spring-loaded latch bolt;

a floating hinge coupling the latch arm to the proximal end of the carrier frame, wherein the floating hinge allows the latch arm to rotate about an axis that is perpendicular to the lateral direction and a longitudinal direction and to move in the longitudinal direction; and a spring disposed between the first and second ends of the latch arm and directed to bias the carrier frame and storage drive in the longitudinal direction when the latch arm is in a closed position and latched condition.

2. The apparatus of claim 1, wherein the spring is selected from a compression spring, a wave spring, a torsion spring, a beam spring and/or a leaf spring.

3. The apparatus of claim 1, wherein the carrier frame is further configured to orient the storage drive housing to position a storage drive connector on a distal end of the storage drive housing for making a blind connection with a mating drive bay connector within a storage drive bay.

4. The apparatus of claim 3, wherein the spring is configured to apply a longitudinal force maintaining the connection between the storage drive connector and the drive bay connector when the latch arm is in a closed position and latched condition.

5. The apparatus of claim 1, wherein the latch arm is selectively securable in the closed and latched condition with the cam latch received in a first slot in a first lateral side wall of a storage drive bay and the latch bolt received in a second slot in a second lateral side wall of the storage drive bay, wherein the first lateral side wall of the storage drive bay opposes the second lateral side wall of the storage drive bay.

6. The apparatus of claim 5, wherein the latch arm is rotatable from the closed and latched condition to an open and unlatched condition by retracting the latch bolt from the second slot and rotating the cam latch toward the carrier frame.

7. The apparatus of claim 5, wherein rotating the latch arm from an open position to a closed position causes the cam latch to move beyond a first lateral edge of the carrier frame and in the longitudinal direction.

8. The apparatus of claim 7, wherein a distal end of the latch bolt has a tapered surface directed to engage the second lateral side wall of the storage drive bay when rotating the latch arm from the open position to the closed position.

9. The apparatus of claim 8, wherein, with the carrier frame positioned in the storage drive bay, rotating the latch arm from the open position to the closed position causes the tapered surface of the latch bolt to contact the second lateral side wall of the storage drive bay, retract toward the latch arm and slide along the second lateral side wall of the storage drive bay, and then extend into the slot in the second lateral side wall of the storage drive bay to become latched.

10. The apparatus of claim 1, wherein the floating hinge includes first and second floating hinge plates that are secured to a proximal end of the carrier frame and each floating hinge plate includes a longitudinal pin slot slidably securing a hinge pin.

11. The apparatus of claim 10, wherein the hinge pin includes a first hinge pin member secured in the longitudinal pin slot of the first floating hinge plate and a second hinge pin member secured in the longitudinal pin slot of the second floating hinge plate, and wherein the latch arm is secured about the first and second hinge pin members, the latch arm is free to pivot about an axis defined by the first and second hinge pin members, and the first and second hinge pin members are free to move along a longitudinal axis of the longitudinal pin slot.

12. The apparatus of claim 11, wherein the hinge pin extends between the first and second floating hinge plates, wherein the spring is a torsion spring including one or more coils secured about a central portion of the hinge pin, a first leg biased against the latch arm and a second leg biased against the proximal end of the carrier frame, wherein the torsion spring biases the latch arm toward an open position when the spring-loaded latch is not secured.

13. The apparatus of claim 11, wherein the hinge pin extends between the first and second floating hinge plates, the apparatus further comprising:

a torsion spring including one or more coils secured about a central portion of the hinge pin, a first leg biased against the latch arm and a second leg biased against the proximal end of the carrier frame, wherein the torsion spring biases the latch arm toward an open position when the spring-loaded latch is not secured.

14. The apparatus of claim 1, wherein the spring-loaded latch bolt includes a spring that biases the latch bolt to extend linearly from the second end of the latch arm.

15. The apparatus of claim 14, further comprising;

a retraction element extending from the latch bolt and accessible for manual retraction of the latch bolt.

16. The apparatus of claim 14, further comprising:

a latch hook extending from the latch bolt toward the carrier frame and configured to be received in a slot in the proximal end of the carrier frame when the latch arm is in a closed position.

17. The apparatus of claim 16, wherein the latch arm is selectively securable in a closed and unlatched condition with the latch hook received in the slot in the proximal end of the carrier frame.

18. The apparatus of claim 17, wherein, with the latch arm secured in a closed and unlatched condition, the cam latch extends laterally beyond the edge of the carrier frame and prevents the carrier frame and storage drive from being fully inserted into the storage drive bay.

19. The apparatus of claim 1, wherein a distance from the floating hinge to a first lateral edge of the carrier frame is less than ¼ of a distance from the floating hinge to a second lateral edge of the carrier frame, and wherein a distance from the floating hinge to a distal end of the cam latch is less than ¼ of a distance from the floating hinge to a distal end of the latch bolt.

20. The apparatus of claim 1, further comprising:

a storage drive bay having a first side wall with a first latch slot, a second side wall with a second latch slot, and a drive bay connector that is secured in a distal end of the storage drive bay and oriented in a proximal direction.

* * * * *